Patented Feb. 24, 1931

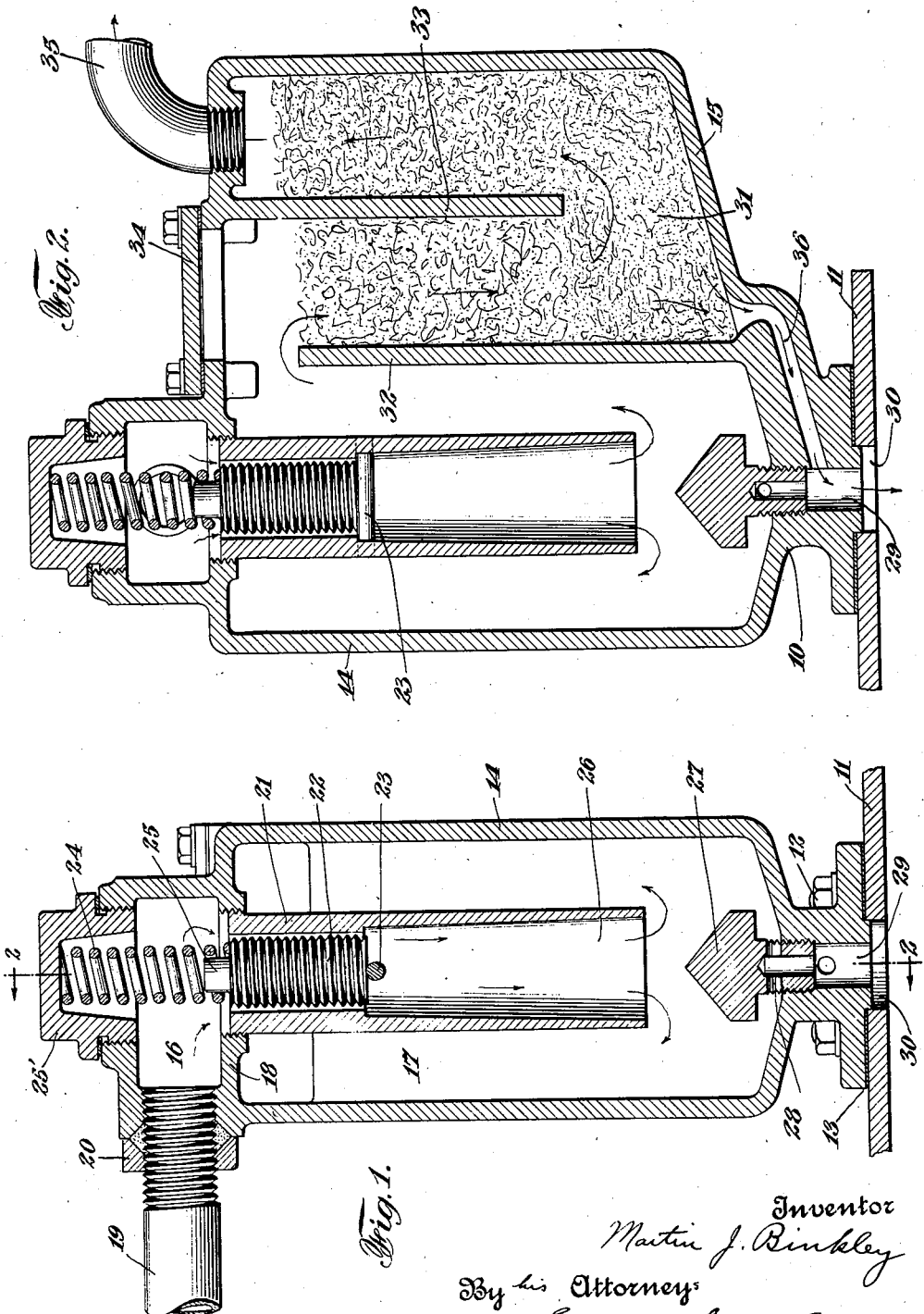

1,793,460

UNITED STATES PATENT OFFICE

MARTIN J. BINKLEY, OF EAST ORANGE, NEW JERSEY, ASSIGNOR TO CALOROIL BURNER CORPORATION, A CORPORATION OF DELAWARE

OIL SEPARATOR AND RECLAIMER

Application filed April 1, 1926. Serial No. 99,181.

This invention relates to a separator and reclaimer, and particularly to an apparatus for separating and reclaiming lubricating oil from compressed air.

The object of this invention is to provide an improved apparatus of this character which will efficiently and rapidly separate and reclaim lubricating oil from compressed air.

Further objects and advantages will be apparent from the following specification and drawing, in which Fig. 1 is a sectional view of an oil separator and reclaimer embodying the invention, and Fig. 2 is a sectional view on line 2—2 of Fig. 1.

In the specific embodiment of the invention illustrated a casing or hollow body section 10 is mounted on an oil containing base 11 by means of bolts 12, with a packing material 13 interposed therebetween. The body section is composed of a cylindrical inlet section 14 and an elongated rectangular outlet section 15.

The inlet section is composed of an upper chamber 16 and a lower chamber 17 separated by a wall 18. The oil containing air from the compressor enters the upper chamber 16 through pipe 19, which is threaded into the upper part of the casing or chamber 16, having a gland 20 to prevent leakage. From chamber 16 the air passes downwardly into chamber 17 through a spiral passage formed between the inner surface of cylindrical tube 21, tightly threaded into wall 18 and extending downwardly into and terminating near the bottom of chamber 17, and the outer threaded surface of solid plug 22 loosely fitting within cylindrical tube 21. The plug 22 is spring pressed by means of the spring 24 against pin 23 of cylindrical tube 21, one end of which spring bears against the screw cap 25' and the other end encircles the head of the plug 22. The spring pressed mounting of the plug 22 permits movement of the plug against the action of the spring 24. The oil-containing air after passing through the spiral passage has some of the minute particles of oil removed by centrifugal force, which throws the heavier particles of oil against the straight side walls of the inner surface of the cylindrical tube 26 as the oil containing air is rapidly whirled through the spiral passage. The minute particles of lubricating oil contained in the compressed air in the form of small globules are thrown with considerable force against the smooth cylindrical surface of the tube, where they form a thin film upon the walls, and the subsequent particles being thrown against this film cohere thereto and a continual film of oil is formed, which when too thick to adhere to the cylindrical wall flows by gravity through the cylindrical tube. The rapidly moving air passing out through the bottom flared end 26 of the cylindrical tube, contacts with deflector 27 threaded in the bottom of the casing, and is deflected upwardly around the outside of the cylindrical tube 21. The separated oil flows from the inner wall of cylinder 21 to the bottom of chamber 17 back into the oil base 11 through oil passage 28 of the deflector, which communicates with the passage 29 of the body 10 and passage 30 of the oil base 11.

The air being forced to the top of chamber 17 passes into the outlet section 15 composed of chamber 31 over the top of baffle plate or partition 32. The downwardly extending baffle plate 33 of the chamber 31 forms a tortuous path for the air as it passes through the apparatus. Within the chamber 31 and on both sides of baffle plate 33 horse hair or equivalent fibrous material is inserted through removable cover 34 to clarify the air as it passes therethrough removing any particles of oil which may have been picked up by the rapidly moving air as it passes through the flaring end 26 of the cylindrical tube 21 from which a film of accumulated oil flows to the bottom of chamber 17. The clarified air passes out of the separator through opening 35 where it is piped to a storage tank or other apparatus.

The particles of oil removed from the horse hair eventually run to the inclined bottom of chamber 31 and into the oil base 11 through passage 36, which communicates with passages 29 and 30 of the separator base and oil base.

It will be readily seen that when the separator described is used in conjunction with an oil sealed slow speed rotary air compressor the oil picked up and carried through the compressor by the air is recovered and returned to the oil base, which base also contains the compressor. Thus, none of the lubricating oil is lost and the cycle is continuous.

Various changes and modifications can be made without departing from the scope of the invention or sacrificing any of the advantages thereof.

I claim:

1. In an apparatus to separate oil and compressed air, a casing having an inlet, a cylindrical tube in said casing and a spiral plug loosely fitting in said tube for longitudinal and pivotal movements and adjacent the inlet for directing the air in a variable spiral path, whereby oil particles are thrown outwardly by centrifugal force, and means for collecting the oil particles.

2. In an apparatus to separate oil from compressed air, the combination of a casing into which the compressed air containing the oil is admitted, a base on which said casing is fixedly supported, means within the casing providing a spiral path for the air whereby the oil particles it contains are thrown outward by centrifugal force, said means comprising elements movable automatically for affording variations of said path in accordance with variations in the pressure of the entering compressed air, and means for collecting the separated oil particles, the air and the collected oil having separate outlets.

3. In an apparatus to separate oil from compressed air, a casing having an inlet, a downwardly directed tube and a spring pressed spiral plug movably fitting within the tube at its entrance section for directing the air in a spiral path, whereby oil particles are thrown outwardly by centrifugal force and collected on the tube walls, a deflecting means adjacent the outlet of said tube for deflecting the air upwardly to an outlet section of said casing provided with baffle plates, a fibrous material forming a tortuous path for the air, and means for collecting the oil particles separated from the air in the tube and outlet section.

4. In an apparatus to separate oil from compressed air, a casing having an inlet, a tube within said casing and spaced from the inner walls thereof said tube having a smooth inner surface and an outwardly expanding outer end portion, a spiral plug within said tube spaced from the inner walls of said tube forming a space therebetween to collect oil particles thrown outwardly by centrifugal force against the smooth inner surface of said tube.

5. In an apparatus to separate oil from compressed air, a casing having an inlet, a downwardly directed tube within said casing and spaced from the inner walls thereof having a smooth inner surface, a spiral plug loosely and movably fitted within the upper portion of said tube spaced from the inner walls of said tube forming a space therebetween to collect oil particles thrown outwardly by centrifugal force against the smooth inner surface of the tube said tube having its lower portion expanding outwardly to spread the flow of air in an outward direction.

6. In an apparatus to separate oil from compressed air, a casing having an inlet, a tube within said casing, a pin passing through said tube, a spiral plug of smaller diameter than the inner diameter of said tube spring pressed against said pin to permit movement of said plug.

7. In an apparatus to separate oil from compressed air, a casing having an inlet, a tube within said casing, a pin passing through said tube, a spiral plug of smaller diameter than the inner diameter of said tube spring pressed against said pin, and a deflecting means directly in line with the tube said deflecting means being provided with an undercut portion forming an oil outlet.

8. In an apparatus to separate oil from compressed air, the combination of a casing into which the compressed air containing the oil is admitted, a base on which said casing is fixedly supported, elements within said casing provided with concentric circular walls spaced apart and at least one of which walls is spirally grooved to provide a spiral passageway for the air whereby the oil particles are thrown outward by centrifugal force, the walls being mounted so that relative movement between them is afforded whereby the passageway may vary automatically in conformity with variations in the pressure of the air passing through it, and means for collecting the separated oil particles.

MARTIN J. BINKLEY.